March 10, 1953  J. MORKOSKI  2,630,666
WINDROWING DEVICE FOR BEET HARVESTERS
Filed July 3, 1948  3 Sheets-Sheet 1

Inventor.
James Morkoski
Paul O. Pippel
Atty.

March 10, 1953 J. MORKOSKI 2,630,666
WINDROWING DEVICE FOR BEET HARVESTERS
Filed July 3, 1948 3 Sheets-Sheet 2

Inventor
James Morkoski
Paul O. Pippel
Atty.

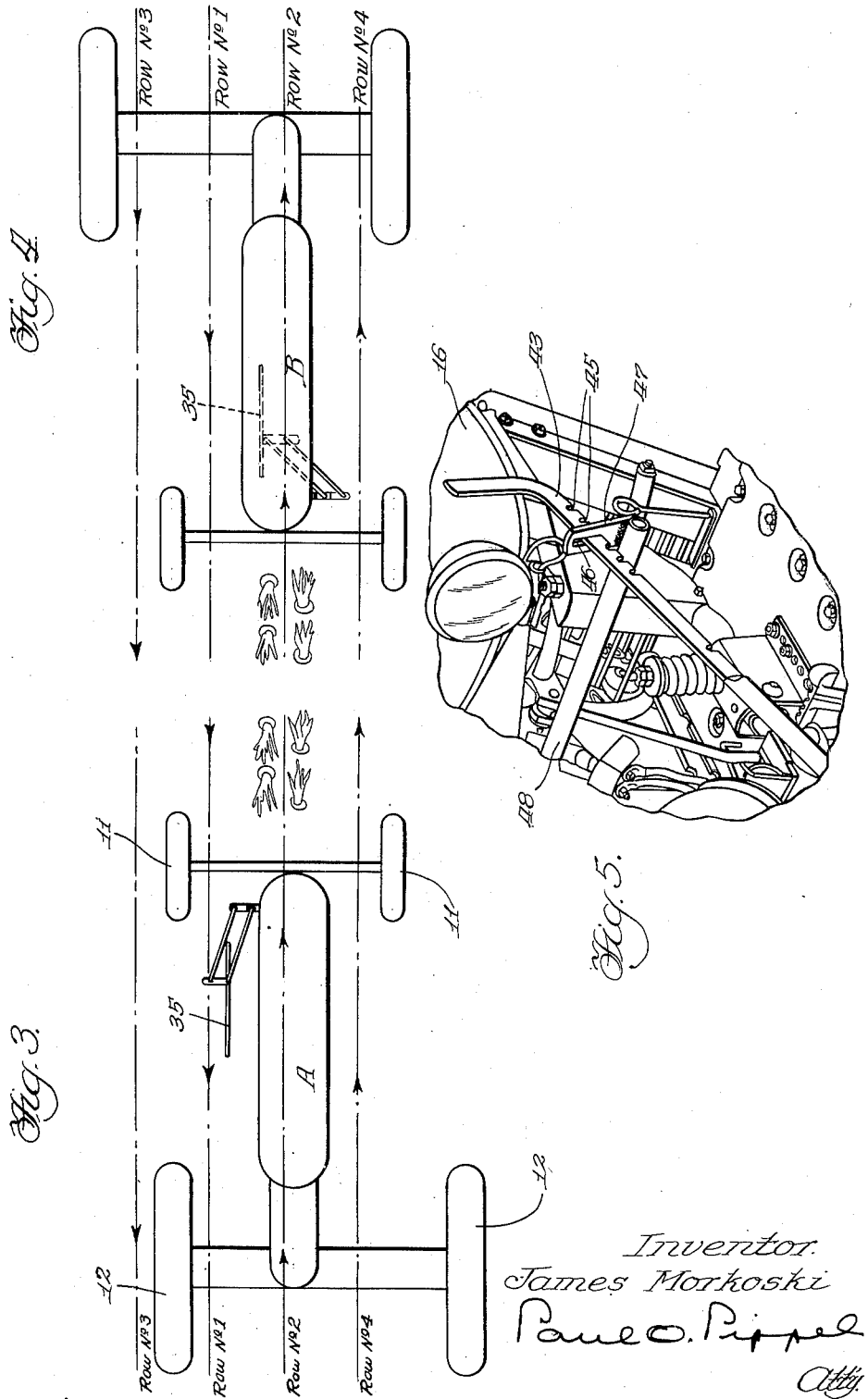

Patented Mar. 10, 1953

2,630,666

UNITED STATES PATENT OFFICE 2,630,666

WINDROWING DEVICE FOR BEET HARVESTERS

James Morkoski, Canton, Ill., assignor to International Harvester Company, a corporation of New Jersey Application July 3, 1948, Serial No. 36,979

7 Claims. (Cl. 56—121.45)

This invention relates to agricultural implements and particularly to beet toppers and harvesters. More specifically, the invention concerns a windrowing attachment for use in connection with beet topping machinery.

In the harvesting of beets by self-propelled harvesters propelled by tractors and the like it is desirable that the foliage growing from the top of the beet be separated therefrom in the harvesting process and frequently prior to removal of the beets from the soil. The beets while still in the ground and prior to being dug therefrom are first subjected to the action of a knife blade or other cutting element which severs the foliage bearing crown from the beet.

In mechanical harvesters, while the beets are removed from the ground and accumulated in receptacles, the beet tops are frequently left in the beet row and may be run over during subsequent trips of the tractor across the field. Since these tops are useful for many purposes, it is desirable that they be accumulated and later removed without being injured, and it is customary for them to be layed out upon the ground and subsequently picked up by other machinery or by hand labor.

An object of the present invention is to provide for use with a topping mechanism for beets and the like means for windrowing the beet tops so that subsequent collection thereof will be facilitated.

Another object of the invention is to provide for use with a beet topper means for windrowing several rows of beet tops in a single row.

Still another object of the invention is to provide a windrowing attachment for a beet harvester, which is adjustable to permit beet tops to be accumulated in a minimum number of windrows in a field to facilitate subsequent collection thereof.

Still a further object of the invention is to provide for use with a beet topper of the type utilizing a cutting element for severing the tops from the beets and a flinger for throwing the tops transversely of the tractor and of the direction of travel, an adjustable windrowing curtain against which the tops are thrown for windrows, the curtain being adjustable to varying distances from the top flinger.

Other objects and advantages of the invention will become clear from the following detailed description when read in conjunction with the accompanying drawings wherein.

Figure 1:
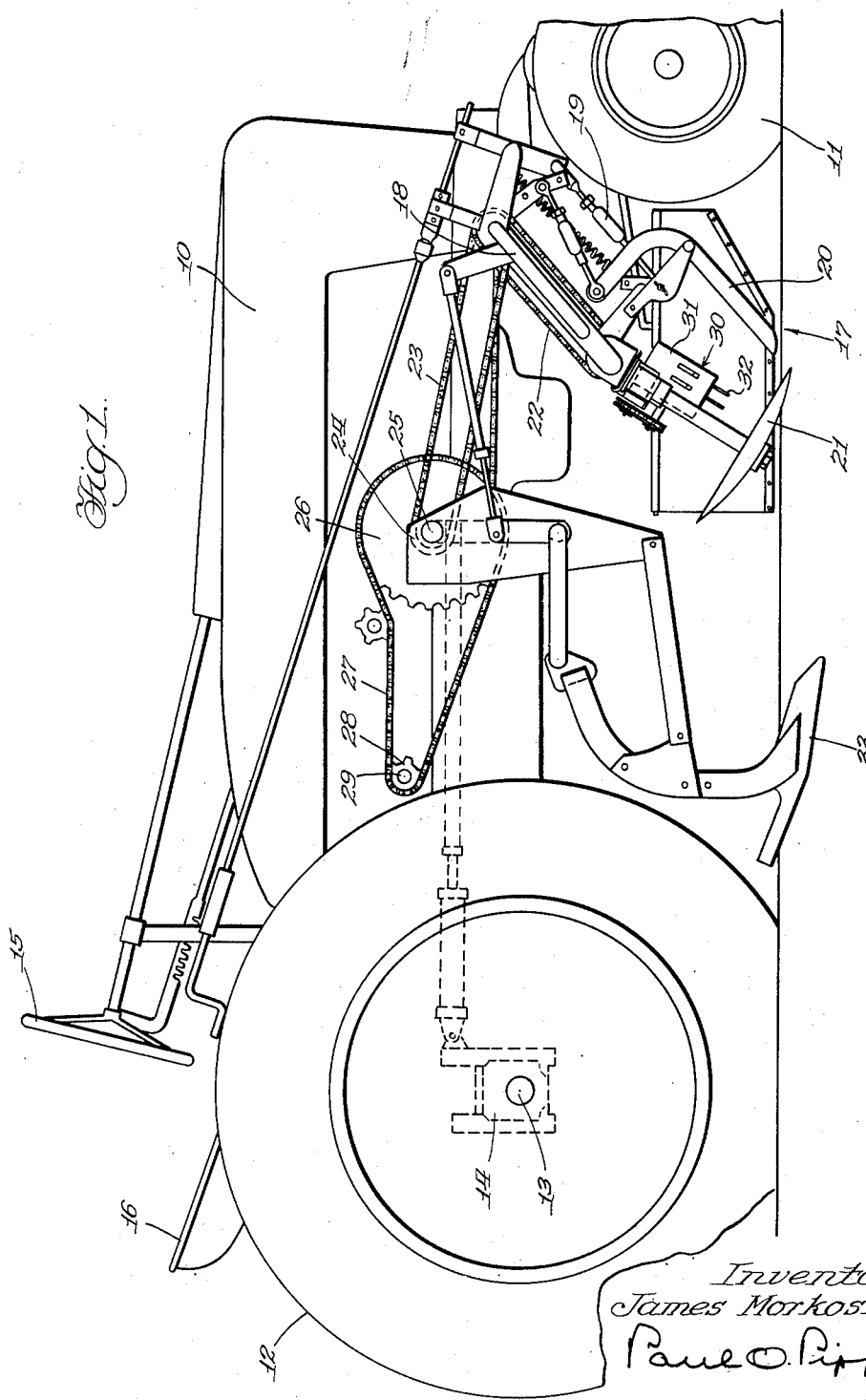
Fig. 1 is a view in side elevation of a tractor having mounted thereupon beet topping and digging mechanism embodying the features of the present invention.
Figure 2:
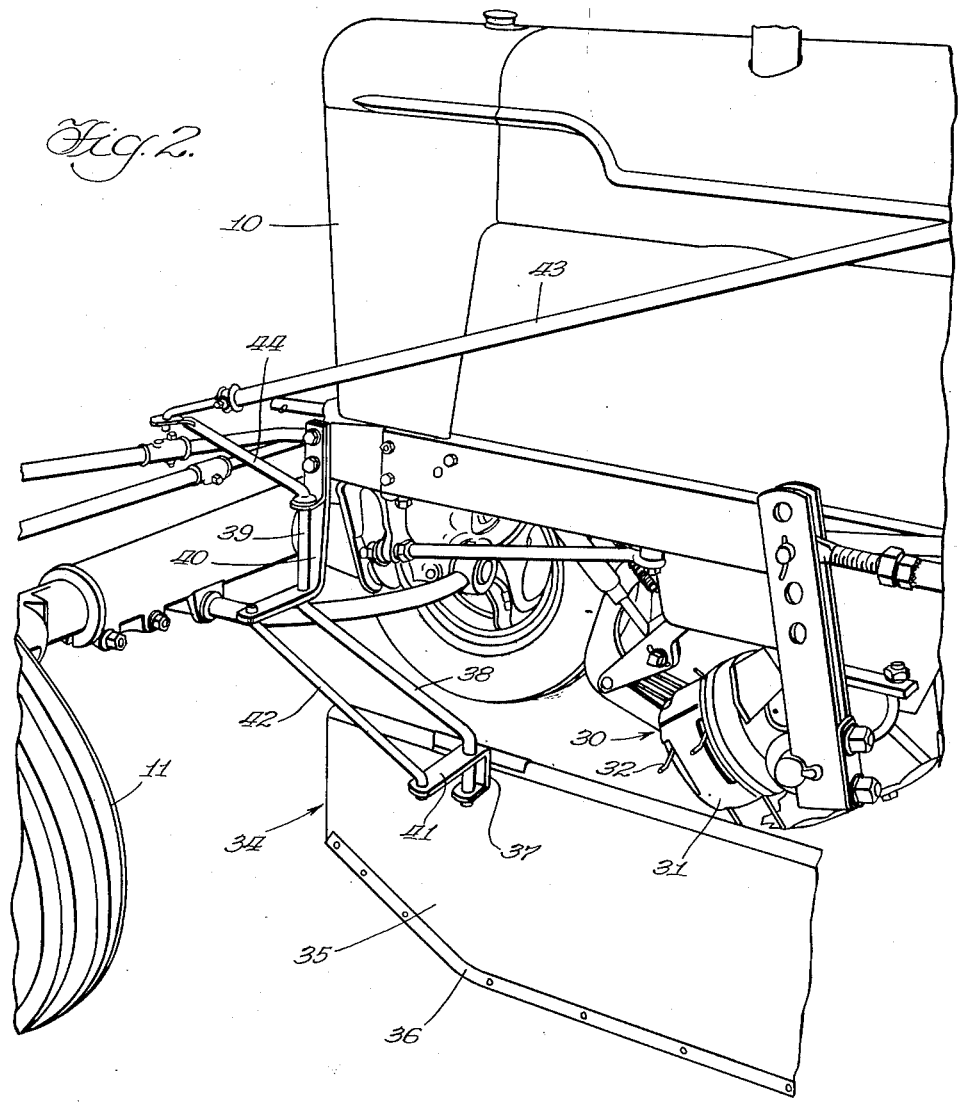
Fig. 2 is a perspective view of the forward end of the tractor showing the manner in which the windrowing curtain is mounted thereupon.

Figs. 3 and 4 diagrammatically illustrate the manner in which a tractor-mounted beet harvester according to the present invention traverses a number of beet rows and the manner in which the windrowing curtain is adjusted.

Fig. 5 is a perspective view showing a detail of the manually operable adjusting mechanism for controlling the position of the windrowing curtain.

Referring to the drawings, numeral 10 designates the body of a tractor having laterally spaced front wheels 11 and laterally spaced rear drive wheels 12, mounted upon an axle 13 carried in a rear axle housing 14. The tractor is provided with conventional steering mechanism 15 and an operator's seat 16.

The harvesting mechanism with which the present invention is concerned is similar to that shown and described in United States application Serial No. 781,449 filed October 22, 1947, and comprises generally a topping unit 17 mounted at the forward end of the tractor between the front and rear wheels thereof. While the construction details of the topping unit 17 are described in the United States application referred to, however, it may be noted that the unit comprises generally a pair of parallel links 18 and 19 mounted upon the side of the tractor for vertical pivotal movement and extending rearwardly therefrom. These links carry a feeler gauge 20 and a cutting disk 21. Gauge 20 is adapted to engage the beets and to rise and fall with the variations in height of the beets encountered and thus gauge the amount of crown removed from the beet by cutting disk 21. The entire unit is thus floatingly mounted for vertical movement about the pivotal connections of the parallel links 18 and 19 to the tractor. Disk 21 is rotated in the manner described in the co-pending United States application referred to through the intermediary of suitable sprocket wheels driven by chains 22 and 23. Chain 23 is mounted upon a sprocket wheel 24 carried upon a shaft 25 which likewise has mounted thereupon a larger sprocket 26 driven by a chain 27 from a sprocket 28 mounted upon a power take-off shaft 29.

Likewise driven by the same drive mechanism which operates the rotary disk 21 is a top flinger device 30. This flinger comprises generally a rotary drum 31 having projecting fingers 32 adapted to engage the beet tops severed by the disk 21 and by the rapid rotation thereof to fling the tops laterally in a direction transverse to the direction of travel of the tractor. The beets are thus removed from the path of the digger blades 33 which are mounted upon the tractor rearwardly of the topping unit 17 and are adapted to lift the beets from the ground. The rotary drum 31 is suitably driven from the same source that drives the disk 21.

In order that the distance to which the beet tops are thrown by the flinger 30 may be limited and to provide for the accumulation of the beet tops in a uniform row as the beet harvester traverses the field, a windrowing device generally indicated at 34 is provided and mounted upon the tractor. This windrowing attachment comprises a curtain 35 of canvas or like heavy material generally rectangular in shape and extending longitudinally of the tractor parallel to the path of travel thereof. The curtain is weighted at its lower end with a metal bar 36 and has secured to its upper edge a bracket 37 U-shaped at the attaching end and orificed to receive the vertically extending bent portion of a link 38. This link 38 is one of a pair of laterally spaced parallel links extending rearwardly from the tractor and its forward end is bent upwardly to provide a spindle portion 39 pivotally mounted in an L-shaped bracket 40 secured by bolts to the side of the tractor body 10 at the forward end thereof. Arm 41 of bracket 37 is also provided with an opening to receive the bent end of the other parallel link 42, the forward end of which is pivotally carried in the bracket 40.

At this point it should be clear that lateral swinging of the parallel links 38 and 42 about their pivots in the bracket 40 will cause movement of the curtain 35 in directions toward or away from the flinger 30. Positions occupied by this windrowing curtain are indicated in the diagrams in Figs. 3 and 4. In Fig. 3 the manner in which the beet harvester with which the present invention is concerned traverses a field is indicated. Tractor A is harvesting the beets in row #4 and the windrowing curtain 35 has been extended far out to the left side of the tractor, the side opposite that upon which the harvesting mechanism is mounted. In the position B of the tractor shown in Fig. 4 the row #1 is being harvested and the windrowing curtain has been set close to the flinger.

The mechanism by which the adjustment of the windrowing curtain 35 is made comprises a rack bar 43 which has its forward end pivotally connected to the end of an arm 44 secured to or forming a part of the spindle portion 39 of link 38. The rear end of the rack bar 43 is provided with a handle and the under surface of the bar has notches 45 formed therein. Bar 43 is passed through a slot 46 in a lug 47 affixed to a pipe 48 mounted upon the tractor. Notches 45 engage the lug 47 in the slot 46 and hold the rack bar and therefore the parallel links 38 and 42 in an adjusted position. The tractor operator from his seat 16 by manipulating the rack bar 43 may thus swing the parallel links 38 and 42 and therefore the curtain 35 transversely of the tractor from a position underneath the body thereof to a position laterally removed therefrom. This adjustment, in order that the beet tops may be deposited by the flinger 30 in the desired position, is made by the tractor operator each time the machine traverses the field without the necessity of the operator leaving his seat upon the tractor.

It is believed that the operation of the windrowing attachment for beet harvesters according to the present invention will be clearly understood from the foregoing description. It should likewise be understood that the invention has been described in its preferred embodiment and that modifications may be made therein without departing from the spirit of the invention. It is therefore desired that the invention be limited only by the scope of the appended claims.

What is claimed is:

1. For use with a tractor mounted topper for beets and the like having discharge means for throwing the severed tops to a location laterally of the path of travel of the topper: a windrowing attachment comprising a bracket carried by the tractor, a pair of laterally spaced generally parallel links pivoted at one end upon the bracket for lateral swinging, a longitudinally extending curtain spaced from the discharge means carried by the other ends of said links in a position to act as a windrowing stop for vegetation thrown thereagainst by the discharge means and swingable therewith, and means for selectively adjusting said curtain to positions at different lateral spacings from said top discharge means.

2. For use with a tractor-mounted topper for beets and the like having discharge means for throwing the severed tops to a location laterally of the path of travel of the topper: a windrowing attachment comprising a pair of laterally spaced generally parallel links pivoted at one end upon the tractor for lateral swinging, one of said links having a vertically extending spindle portion, an arm on said spindle portion, adjusting means accessible to the tractor operator and connected to said arm for swinging said links to selected position transversely of the tractor, and means serving as a curtain carried by the free ends of said links and movable therewith to adjusted positions to serve as a stop for vegetation thrown thereagainst by said discharge means.

3. A windrowing attachment for use with a tractor mounted topper for beets and the like therein a cutting blade for severing the tops is associated with a flinger for discharging the severed tops laterally of the path of travel of the topper, comprising means serving as a curtain laterally spaced from the topper in the path of travel of vegetation discharged by the flinger to serve as a stop therefor, connecting means between the curtain and the tractor accommodating adjustment of the spacing between the curtain and the flinger, and means for adjusting the lateral spacing between the curtain and the flinger, whereby to vary the lateral distance to which the beet tops may be thrown.

4. A windrowing attachment for use with a tractor mounted topper for beets and the like wherein a cutting blade for severing the tops is associated with a flinger for discharging the severed tops laterally of the path of travel of the topper, comprising means serving as a curtain laterally spaced from the topper in the path of travel of vegetation discharged by the flinger to serve as a stop therefor, connecting means between the curtain and the tractor accommodating adjustment of the spacing between the curtain and the flinger including a swinging link pivotally connected to the tractor and to the curtain on vertical axes, and adjusting means accessible to the tractor operator from his station thereon and operatively connected to said swinging link for moving it laterally, whereby to vary the lateral spacing between the curtain and the top flinger.

5. A windrowing attachment for use with a tractor mounted topper for beets and the like wherein a cutting blade for severing the tops is associated with a flinger for discharging the severed tops laterally of the path of travel of the topper, comprising means serving as a curtain laterally spaced from the topper in the path of travel of vegetation discharged by the flinger to serve as a stop therefor, connecting means between the curtain and the tractor accommodating adjustment of the spacing between the curtain and the flinger including a pair of laterally spaced parallel links pivotally connected to the tractor and to the curtain on vertical axes for lateral swinging movement, and adjusting means accessible to the tractor operator from his station thereon and operatively connected to said parallel links for swinging them laterally about their pivots on the tractor, whereby to vary the lateral spacing between the curtain and the top flinger.

6. A windrowing attachment for use with a tractor mounted topper for beets and the like wherein a cutting blade for severing the tops is associated with a flinger for discharging the severed tops laterally of the path of travel of the topper, comprising means serving as a curtain laterally spaced from the topper in the path of travel of vegetation discharged by the flinger to serve as a stop therefor, connecting means between the curtain and the tractor accommodating adjustment of the spacing between the curtain and the flinger including a pair of laterally spaced parallel links pivotally connected to the tractor and to the curtain on vertical axes for lateral swinging movement and a rack bar accessible to the tractor operator from his station thereon connected to said parallel links for moving them laterally about their pivots on the tractor to selectively adjust the lateral spacing between the curtain and the top flinger.

7. For use with a traveling topper for beets and the like, a support for the topper, discharge means mounted on the support arranged to engage the beet tops and throw them to a location laterally of the path of travel of the topper, stop means adjustably carried by the support at a location laterally spaced from the discharge means and in the path of travel of tops discharged thereby, whereby to serve as a stop for the tops and to accumulate them in a windrow, and means mounted on the support and operatively connected to the stop means for adjusting the latter laterally to vary the lateral spacing of the stop means from the discharge means.

JAMES MORKOSKI.

REFERENCES CITED

The following references are of record in the file of this patent:

UNITED STATES PATENTS

| Number | Name | Date |
|---|---|---|
| 744,142 | Whitely | Nov. 17, 1903 |
| 874,399 | Gaterman | Dec. 24, 1907 |
| 1,026,714 | Smith | May 21, 1912 |
| 1,080,397 | Willis | Dec. 2, 1913 |
| 1,748,746 | Zuckerman | Feb. 25, 1930 |
| 1,768,195 | Driscoll | June 24, 1930 |
| 2,052,802 | Schatz | Sept. 1, 1936 |
| 2,390,321 | Packwood | Dec. 4, 1945 |
| 2,429,044 | Bassett | Oct. 14, 1947 |
| 2,489,059 | Surgi | Nov. 22, 1949 |
| 2,495,032 | Stuhl | Jan. 17, 1950 |